3,482,987
REMOVING DELETERIOUS VOLATILES FROM COFFEE
Esra Pitchon, Flushing, Alonzo H. Feldbrugge, New York; and Marvin Schulman, Monroe, N.Y., assignors to General Foods Corporation, White Plains, N.Y., a corporation of Delaware
No Drawing. Filed Aug. 10, 1966, Ser. No. 571,381
Int. Cl. A23f 1/04
U.S. Cl. 99—65                          6 Claims

ABSTRACT OF THE DISCLOSURE

A new process has been discovered for improving the quality of lower grade roasted coffees by removing undesirable flavor and aroma volatiles and $CO_2$ prior to further processing of the coffee. The roasted coffee is quenched with enough water to raise the moisture content to 10–30% and the water is allowed to equilibrate in the beans thereby driving out the volatiles and unexpectedly improving the flavor.

---

This invention relates to removal of undesirable aroma components and gases from coffee to thereby improve coffee flavor as well as further processing of the coffee.

It has been known that the carbon dioxide retained in the roasted bean is not fully released upon grinding and presents problems in non-soluble (roasted and ground coffee) production and in soluble coffee production. In packaging of roasted and ground coffee, the carbon dioxide retained in the bean is released slowly on storage, necessitating the use of strong containers which can withstand the increase in pressure while in soluble coffee production the carbon dioxide is released in the percolator columns presenting troublesome gas pockets and foam which hinder the extraction operation. Moreover, it is known that coffee contains certain harsh, tarry, or earthy type of volatile notes which detract from the stability, flavor and aromo of coffee. Certain types of coffee, depending on the region and climate where harvested, contain a characteristically higher or lower level of these undesirable volatiles. It would be desirable if a simple and effective process were developed which could improve the flavor of all coffee beans regardless of the region where they are grown and harvested and which would also avoid the problems inherent in $CO_2$ retention.

It is on object of this invention to remove a substantial amount of carbon dioxide present in the coffee after roasting and prior to percolation.

Another object of this invention is to improve the flavor of roasted coffee by releasing or volatilizing the undesirable aromatic components present in coffee and discarding these undesirable volatiles.

Still another object of this invention is to improve the stability of aroma sources, such as steam volatile flavor fractions, coffee oil, etc. by removing unstable volatiles from the coffee prior to the aroma removal step.

Still other objects will appear from a perusal of the following description and claims.

This invention is founded on the discovery that roasted coffee can have its carbon dioxide and undesirable aroma content substantially decreased by quenching the roasted coffee with a sufficient amount of water to raise the moisture content of the beans to between 10% and 30% and then tempering the beans for a sufficient period of time to allow the added moisture to equilibrate throughout the beans, thereby releasing the undesirable volatiles and carbon dioxide present in said beans.

The term "quenching" as defined in this specification and claims means the addition of a substantial amount of water to roasted coffee beans in either the ground or whole bean form while said beans are preferably at an elevated temperature. Generally, the beans will have a product temperature of between 300° and 500° F. and be increased in moisture above 15%, preferably about 20%, by weight water. However, beneficial results can still be obtained after the beans have cooled to product temperatures as low as 150° to 200° F. At temperatures below 150° F. the beneficial results are less pronounced although still detectable. The temperature of the water used for quenching can vary over a wide range of from 32° F. to 180° F., but is preferably between 70° to 120° F.

Tempering, as defined herein, means curing, holding or retention of the beans (after the moisture addition) at ambient or elevated temperature for a time sufficient to allow the moisture to be absorbed by the interior portions of the bean. The tempering time will vary with the charge of roasted coffee, temperature of the coffee, amount of moisture added, temperature of the water, and other variables. Generally, it has been found that a period of 1 to 2 hours is sufficient to temper the beans and thereby expel the $CO_2$ and undesirable volatiles. However, under certain conditions a 15 minute retention time is sufficient. Retention time of 10 to 20 hours are effective but no increase in beneficial results over 2 hours is attained. However, retention times in excess of 24 to 30 hours will produce some flavor degradation in the beans which will increase with the time of tempering.

Essentially, this invention involves the addition of a sufficient amount of water to roasted coffee beans and then allowing the beans to cure or temper in order to allow moisture equilibration into the interior portions of the beans. This forces out the retained carbon dioxide and undesirable volatiles which are present in said beans. It is understood that while it is preferable to add the moisture to the hot beans during normal quench (following roasting of the beans) that the process can be modified by addition of the required amount of water to the beans after they have cooled as a separate operation. However, this will then require longer curing or tempering times in order to expel the undesirable volatiles and achieve good moisture distribution within the beans. The tempering time may be accelerated by the application of heat.

After the beans have been both quenched with the required amount of water and tempered for the required amount of time, the beans can be further processed in various different ways. The beans can be ground and directly forwarded to a percolation operation in the case where a soluble coffee product is desired. Here, the coffee will be found to experience improved processing conditions from the standpoint of avoiding foaming of the coffee and the development of gas pockets in the percolator. Where a roasted and ground coffee product is desired, advantages will be realized by the use of thin walled vacuum cans which need not withstand the conventional increase in pressure due to release of $CO_2$ and other gases on storage.

In the case where the coffee beans are used for soluble coffee production, the moistened and tempered coffee need not be dried but merely sent to the percolation train.

In the case where a conventional roasted and ground coffee is desired, the moistened and tempered coffee must be dried. However, the method of drying the wet coffee is not critical to the invention and may be accomplished under varying conditions ranging from air and vacuum-drying at low temperatures (90° to 150° F.) over relatively long periods of time to rapid drying conditions at elevated temperatures (500° to 700° F.).

It is also possible, and may be desirable in the case of certain types of coffee, to remove a volatile aroma fraction during the drying operation. This desirable aroma fraction can be collected by condensation and added either alone or together with other aromas to soluble coffee extract prior to or after drying. Aroma collection can be accomplished by merely heating the coffee in a closed or open chamber and then collecting the volatiles which are released. Sufficient water is present in the beans to avoid roasting while producing steam vapors carrying aromatic volatiles which can be collected. Preferably, steaming or heat treatment is conducted for a short period of time and the aroma is collected from the coffee beans after the coffee beans have reached a product temperature of 200° to 280° F. The most desirable aroma is collected at a product temperature of between 230° F. and 250° F., the aroma being collected by conventional condensers at temperatures of 32° to 70° F.

This invention will now be described by reference to several specific examples.

EXAMPLE I

Green Robusta coffee (Indonesian) (400 grams) was roasted in an experimental one pound coffee roaster, then was quenched with a water spray (50 ml. of water) in the roaster to conventional 3% moisture, for use as a control. The same green coffee was similarly roasted in the same roaster, then was quenched with a water spray (300 ml. of water) in the roaster to about 18–20% moisture, for use as a variant. In each of the above roasts, roasting time was about 15½ minutes at a temperature of 500° F. Under these conditions, the beans had achieved the required degree of roasting for normal flavor quality. A part of the high-moisture variant coffee was held at 35° F. for 4 hours; the remainder was held at 150° F. for 4 hours. Each of these variant samples was then dried to the moisture of the control in two ways: in the above roaster for 2 minutes at 650° F., and in a forced convection oven in a thin layer overnight at 130° F. In expert panel flavor testing all 4 of the dried variant samples were judged significantly different from the control and were less earthy and tarry than the control. Reduction in earthy and tarry character is considered a flavor improvement in Robusta coffees.

EXAMPLE II

Green Robusta coffee was roasted as in Example I, then quenched in cold air to 0.6% moisture content. A part of the coffee was coarsely ground, the remainder was held as whole beans. Both the ground and whole beans were moistened at ambient temperature to about 3% moisture and to about 16% moisture, by means of a water spray. Gas evolution at ambient temperature was measured as a function of time, as shown in the table below.

GAS EVOLUTION, Ml. (STP,* AS $CO_2$) PER POUND OF ROASTED COFFEE, DRY BASIS

|  | Dry (0.6% $H_2O$) | | 3% $H_2O$ | | 16% $H_2O$ | |
| --- | --- | --- | --- | --- | --- | --- |
|  | Whole | Ground | Whole | Ground | Whole | Ground |
| 1 hr | 10 | 60 | 60 | 90 | 605 | 565 |
| 4 hrs | 15 | 180 | 155 | 235 | 1,165 | 970 |
| 24 hrs | 80 | 355 | 300 | 440 | 1,820 | 1,185 |

*STP=Standard temperature and pressure.
NOTE.—Total gas in beans originally was about 3,000 cc.

EXAMPLE III

As an example of commercial application, green Robusta coffee (Indonesian variety) was roasted conventionally in a 500-pound Thermalo roaster and quenched with about 9 gallons of water in the roaster to conventional 3% moisture, for use as a control. Another 500 pound charge of Robusta coffee was similarly roasted in the same roaster, then was quenched with about 24 gallons of water in the roaster to about 21% moisture, for use as a variant. In each of the above roasts, roasting time was about 19 minutes at an end temperature of about 440° F. Under these conditions the beans had achieved the required degree of roasting for normal flavor quality. After roasting, the variant was held or tempered under ambient conditions for 2 hours. The variant, after tempering, was found to have lost about 80% of its initial gas content, whereas the control lost less than 5% of its initial gas content. About one-half of the coffee was then dried in a Shanzer-type dryer (a 4-inch deep bed of coffee beans exposed to an air stream moving through the bed at 300° F.), for 18 to 20 minutes, while the remaining beans were dried in a 2-inch deep bed exposed to air at 425° F. for 90 to 100 seconds. Moisture content was reduced to that of the control. The variants were evaluated by an expert flavor panel both before and after drying under both of the above dryer conditions. In both cases, the variant was found to be different from the control and to have an improved flavor as evidenced by a reduction of harsh, earthy, tarry notes.

While this invention has been described by reference to specific examples, it is understood to be limited only by the scope of the appended claims.

What is claimed is:
1. A process for removing undesirable flavor and aroma volatiles and $CO_2$ from roasted coffee having a high level of undesirable flavor and aroma volatiles prior to percolation which comprises wetting roasted coffee beans with a sufficient amount of water to raise the moisture content of said coffee to between 10% and 30% by weight water, tempering said beans to allow said moisture to equilibrate throughout the coffee to thereby expel $CO_2$ and undesirable flavor and aroma volatiles, and then further processing said coffee.

2. The process of claim 1 wherein the beans are roasted, quenched with said water to terminate roasting, and tempered for at least 15 minutes to equilibrate the moisture.

3. The process of claim 2 wherein the beans are quenched while at a temperature of above 300° F. to raise the moisture content of said beans to between 15% and 20%, and then tempering said beans for 15 minutes to 2 hours.

4. The process of claim 3 wherein the tempered beans are dried to a stable moisture level.

5. The process of claim 1 wherein the beans are roasted, cooled to below 200° F., wet to between 15% and 20% moisture, and then tempered for at least 1 to 2 hours to equilibrate the moisture.

6. The process of claim 5 wherein the tempered beans are dried to a stable moisture level.

References Cited

UNITED STATES PATENTS 2,360,342  10/1944  Heyman _____ 99—71

FOREIGN PATENTS 979,531  1/1965  Great Britain.

OTHER REFERENCES

Tea and Coffee Trade Journal, vol. 122, No. 3, 1962, pp. 30, 32, 34–36.

MAURICE W. GREENSTEIN, Primary Examiner

U.S. Cl. X.R.

99—68, 71, 152